United States Patent
Sugiura et al.

(10) Patent No.: US 6,901,605 B1
(45) Date of Patent: May 31, 2005

(54) CABLE BROADCASTING SYSTEM

(75) Inventors: Toshihiro Sugiura, Nisshin (JP); Eiji Shibata, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 0 days.

(21) Appl. No.: 09/473,080

(22) Filed: Dec. 28, 1999

(30) Foreign Application Priority Data

Dec. 29, 1998 (JP) .......................................... 10-377609

(51) Int. Cl.$^7$ ............................................. H04N 7/173
(52) U.S. Cl. ..................... 725/118; 725/148; 725/130; 725/127
(58) Field of Search ............................... 725/127–130, 725/107, 118, 119, 149, 150

(56) References Cited

U.S. PATENT DOCUMENTS

| | | | | |
|---|---|---|---|---|
| 4,118,669 A | * | 10/1978 | Fung ............................ | 725/25 |
| 4,367,557 A | * | 1/1983 | Stern et al. .................. | 725/149 |
| 5,953,044 A | * | 9/1999 | Kato et al. ................... | 725/148 |
| 6,033,101 A | * | 3/2000 | Reddick et al. .............. | 700/286 |
| 6,067,440 A | * | 5/2000 | Diefes .......................... | 725/27 |
| 6,130,703 A | * | 10/2000 | Spriester et al. ............. | 725/127 |
| 6,453,473 B1 | * | 9/2002 | Watson, Jr. .................. | 725/120 |
| 6,463,588 B1 | * | 10/2002 | Jenkins et al. ............... | 725/127 |

* cited by examiner

Primary Examiner—Chris Grant
Assistant Examiner—Christopher Nalevanko
(74) Attorney, Agent, or Firm—Davis & Bujold, P.L.L.C.

(57) ABSTRACT

In a cable broadcasting system of the invention capable of setting output or stop of broadcasting-signals from tap output terminals of a tap device in response to a command signal transmitted by a center equipment, when demand for output setting for many tap devices occurs, output setting of the corresponding tap devices can be surely carried out without increasing the load on each power supply device for supplying the tap devices in each district with electricity. When demand for setting tap output of plural tap device occurs, a head-end controller reads output setting data for all the tap devices which are the objects of tap output setting and transmits command signals in order to tap devices at a rate of one tap device per each district covered by a power supply device. The interval of transmission of command signals to one district is controlled to be longer than or equal to the time $\Delta tn$ necessary for the tap device to which a command signal was previously transmitted to finish tap output setting operation.

5 Claims, 5 Drawing Sheets

FIG. 5
OUTPUT SETTING DATA
| ADDRESS | TERMINAL NUMBER | DISTRICT NUMBER | TAP OUTPUT SETTING VALUE |
|---------|-----------------|-----------------|--------------------------|
| 0001    | 4               | 2               | T1=ON,T2=OFF,T3=ON,T4=ON |
| 0023    | 2               | 1               | T1=ON,T2=ON              |
| 0065    | 8               | 3               | T1=OFF,T2=ON,T3=ON,⋯⋯    |
| ⋮       | ⋮               | ⋮               | ⋮                        |
FIG. 6
TRANSMISSION DATA
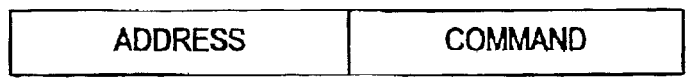
| ADDRESS | COMMAND |
FIG. 7
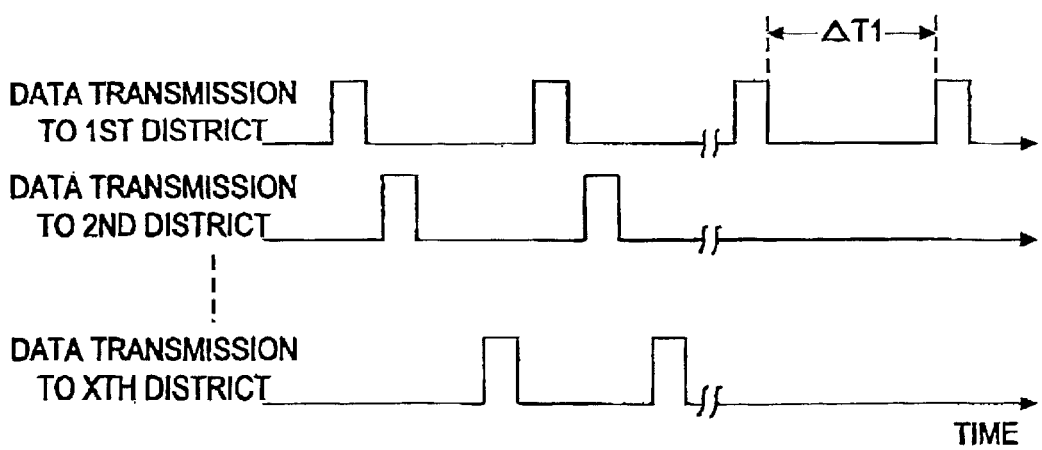
TIME

CABLE BROADCASTING SYSTEM

BACKGROUND OF THE INVENTION (i) Field of the Invention

The invention relates to a cable broadcasting system in which whether or not broadcasting signals should be outputted from tap output terminals of a tap device provided on a transmission line for transmitting broadcasting signals is set by command signals transmitted from a center equipment to a transmission line.

(ii) Description of Related Art

Heretofore, in a cable broadcasting system such as a CATV system where broadcasting signals such as television signals and the like are transmitted to a subscriber's terminal via a transmission line consisting of a coaxial cable and the like, tap devices for branching the broadcasting signals (the so-called tap-off) from the transmission line and transmitting the signals to the subscriber's terminal are dispersedly provided on the transmission line.

Some of such tap devices for the cable broadcasting system are known to be designed so that it is set by command signals from the center equipment whether broadcasting signals should be outputted from the tap output terminals or not.

Specifically, a relay that can transmit broadcasting signals of high frequency with a small loss is provided in the signal pass between a directional coupler by which broadcasting signals are partially branched from a transmission line and a tap output terminal for outputting the branched broadcasting signals to the subscriber's terminal. The relay is the so-called high frequency relay. Usually, a latching relay capable of keeping the condition of on or off is used. In the above-mentioned electronic device, or the tap device, it is designed that by supplying the relay with electricity in response to a command signal transmitted from the center equipment via the transmission line, the condition of on or off of the signal pass is easily changed (that is, the broadcasting signal is transmitted to the subscriber's terminal or not) from the center equipment.

In a cable broadcasting system equipped with such tap devices, a characteristic identifying data (the so-called "address") is given to each tap device. When the center equipment sets the condition of output or stop of broadcasting signals from tap output terminals of a specific tap device, the center equipment produces a command signal by adding a command data (the so-called "command") expressing a content of the command to the address of the corresponding tap device and transmits the command signal to the transmission line. In the tap device, command signals transmitted from the center equipment are received by a receiving circuit, a command signal having the same address as its own address is selected among the received command signals by a control circuit and the operation mode is set according to the command contained in the command signal.

Therefore, in such a kind of cable broadcasting system, for example, when output of broadcasting signals from a tap output terminal of a specific tap device to a subscriber's terminal equipment is to be stopped or started in response to the subscriber's demand, output or stop of broadcasting signals from the tap output terminal of the specific tap device can be easily set only by transmitting a command signal from the center equipment to the tap device which is the object of setting of tap output. In the case, there is no need for the operator to visit the place where the tap device is equipped for setting the tap output of each tap device.

In the above-mentioned tap device, electricity for operation must be supplied from the outside in order to operate a relay after receiving a command signal from the center equipment. In a cable broadcasting system provided with the above-mentioned tap device, the transmission line is sectioned into plural districts. A power supply device is provided in each district for supplying tap devices in each district with electricity. A power voltage for operating built-in circuits is produced from the power signal supplied to the transmission line in each tap device, by supplying power signals from the power supply device to the transmission line.

However, in the above-mentioned conventional broadcasting system, for example, setting of tap output is occasionally demanded for all or some of the tap devices on the transmission line at the center equipment side.

In such a case, the center equipment produces command signals in order for the plural tap devices for setting tap output and transmits the signals to the transmission line. Heretofore, the order of transmission of command signals was decided according to, for example, order of addresses given to tap devices or order in a list of tap devices defined by the outer equipments which demanded tap output setting. Specifically, since the order of transmission of command signals was determined unconditionally by addresses of tap devices or a list made by input from the outer equipments, transmission of command signals was occasionally concentrated to tap devices in the same district which was supplied with electricity by the same power supply device.

As a consequence of concentration of transmission of command signals to tap devices in a specific district, load on the power equipment for supplying the tap devices in the district increased temporarily, occasionally causing failure of sufficient electricity supply to the tap devices in the district.

Specifically, since a tap device supplies a relay with electricity and sets output or stop of a broadcasting signal from a tap output terminal after receiving a command signal from the center equipment and decoding the signal, it takes a long time until the tap device completes setting operation of tap output (that is, until electricity supply to the relay is completed). Therefore, when command signals are transmitted in order from the center equipment to tap devices in the same district, plural tap devices in the same district which received command signals turn on relays at the same time and load on the power supply device in the district becomes heavy, thereby failing sufficient electricity supply to the plural tap devices.

In order to solve the problem, the capacity of the power supply device in each district may be increased. But such a means is not available because big-sizing of the power supply device causes increase of manufacturing cost, with increase of total cost of the cable broadcasting system.

SUMMARY OF THE INVENTION

An object of the invention is to set surely output of a tap device without increase of load on a power supply device for supplying tap devices with electricity in each district in a cable broadcasting system in which output or stop of broadcasting signals from tap output terminals of a tap device provided on a transmission line is set by command signals transmitted from a center equipment to the transmission line.

According to the present invention, a command signal produced at a transmission equipment is transmitted from a center equipment to a transmission line in addition to broadcasting signals outputted by a broadcasting system.

The command signal is a signal for setting whether broadcasting signals are outputted from or stopped at a tap output terminal for each tap device provided on a transmission line. On the transmission line, there are provided the tap devices which receive the command signal and can automatically set tap output in response to the command signal when the received command signal is for itself, and a power supply device for supplying the tap device on the transmission line with electricity, provided dispersedly in each of districts of the transmission line made by sectioning the transmission line into plural sections.

The tap device is for branching a part of broadcasting signals transmitted in the transmission line into subscribers' terminal equipments. It is provided with a directional coupler for this purpose and tap output terminals for outputting broadcasting signals branched at the directional coupler to subscribers' terminal equipments. Latching relays for changing over the condition of on or off of signal passes are provided in the signal passes which transmit broadcasting signals from the directional coupler to the tap output terminals.

The latching relay can change over its contact position when electricity is supplied to a relay coil. It is of a known type which can keep its contact position when electricity is not supplied and changes over the condition of on or off (that is, output or stop of broadcasting signals from the tap output terminal) of the signal pass when supplied with electricity by an operation circuit.

The tap device is also provided with a receiving circuit for receiving command signals transmitted from the center equipment. When the receiving circuit receives a command signal to the tap device, a control circuit sets output or stop of broadcasting signals from the tap output terminal by supplying the latching relay with electricity via the operation circuit in response to the command signal.

The built-in circuits in the tap device comprising the operation circuit, receiving circuit, control circuit and the like are operated by receiving electricity from a power source circuit in the tap device. The power source circuit takes in a power signal from the transmission line, converts the power signal to a voltage for operation and supplies each built-in circuit with electricity.

When demand to all or some of the tap devices for setting tap output occurs at the center equipment side in such a cable broadcasting system and command signals are transmitted indiscriminately from the center equipment to the tap devices to be set in response to the demands, transmission of the command signals is occasionally concentrated to tap devices in the same district supplied with electricity by the same power supply device, thereby load on the power source equipment of the district being occasionally increased temporarily.

However, in the invention, a transmission equipment of the center equipment is constituted by a command signal producing means and command signal transmission means. When a command for setting tap output is inputted from the outside to all or some of the plural tap devices on the transmission line, firstly at the command signal producing means, command signals to all the tap devices for which tap output is to be set in response to the command for setting are produced in order at a ratio of one tap device per one district provided with the power supply device, and the command signals produced at the command signal producing means are transmitted in order to the transmission line by the operation of the command signal transmission means.

Therefore, in the cable broadcasting system of the invention, when demands for setting tap output to many tap devices occur, there is avoided concentration of command signals from the center equipment to the tap devices in the same district supplied with electricity by the same power supply device and the destination of transmission of the command signals can be diversified to different districts.

As a consequence, in the cable broadcasting system of the invention, latching relays of plural tap devices in the same district are prevented from being simultaneously supplied with electricity, thereby load on the power supply device in each district being alleviated, with a result that tap output of each tap device can be surely set by the supply of electricity from the power source equipment. Since load on the power supply device in each district can be decreased, the capacity of the power supply device in each district does not need to be big for surely setting tap output of the tap device, thereby preventing increase of cost of the total system.

Here, in the invention, when demand for setting tap output occurs to many tap devices, destinations of transmission of the command signals are diversified to various districts covered by the power supply devices. But when the number of tap devices to which the command signals are to be transmitted become too many in a specific district, only some of the tap devices in the specific district finally remain as tap devices to which the command signals have not been transmitted, even if the command signals are transmitted in order at a ratio of one tap device per each district. After such a case occurs, the command signals are continuously transmitted to the tap devices in the specific district. If the command signals are to be transmitted in order during the transmission, the tap devices in the same district carry out setting operation of tap output (turning on of latch relays) simultaneously, with a result that load on the power supply device in the district is increased.

For resolving the problem, the command signal transmission means in the transmission equipment of the center equipment side may be constituted according to a further aspect of the invention.

Specifically, in a cable broadcasting system according to the further aspect of the invention, when the command signal producing means produces a command signal to a specific tap device, in the command signal transmission means, an elapsed time determining means determines whether elapsed time after a previously transmitted command signal was transmitted to the same district as the destination of transmission of the newly produced command signal has got to an operation time necessary for the tap device to which a command signal was transmitted previously to finish tap output setting operation.

The command signal transmission equipment transmits the new command signal produced in the command signal producing means to the transmission line, after it was determined that elapsed time after the previous command signal was transmitted to a tap device in the same district of a tap device to which the command signal is now to be transmitted has got to operation time of the tap device to which the previous command signal was transmitted.

As a result, according to the cable broadcasting system of the further aspect of the invention, even when the number of tap devices to which command signals are to be transmitted from the center equipment is too large in a specific district, one tap device for tap output setting operation is provided in one district and it is prevented that plural tap devices simultaneously carry out tap output setting operation (turning on of latching relays). Therefore, according to the further aspect of the invention, a power supply device in each district has only to supply one tap device with electricity in the district, thereby load on the power source equipment being surely decreased compared with that of the first example of the invention.

In a cable broadcasting system of another aspect of the invention, some of the plural tap devices provided on the transmission line in the above-mentioned broadcasting systems are provided with splitters which further distribute broadcasting signals branched by directional couplers into the pluralities and output the distributed broadcasting signals to plural tap output terminals. A latching relay is provided in each of plural signal passes from the splitter to plural tap output terminals in each of the tap devices. When a control circuit controls the condition of on or off of each signal pase in response to a command signal received by a receiving circuit, the control circuit turns on each latching relay in order and sets the condition of on or off of each signal pass by controlling an operation circuit.

Specifically, in this broadcasting system, some of the plural tap devices are provided with plural tap output terminals. Output or stop of broadcasting signals from each of the plural tap output terminals is individually set in response to a command signal from the center equipment. When setting output or stop of broadcasting signals from each tap output terminal, the latching relays for setting output from the tap output terminals are turned on not simultaneously but one by one in order.

Therefore, according to the invention, instantaneous electricity consumption necessary for setting output or stop of broadcasting signals from each tap output terminal (that is, electricity for operation supplied to the tap device) can be made equal to that for a tap device with one tap output terminal in the tap device with plural tap output terminals.

Therefore, according to the invention, even when the tap device on the transmission line is provided with plural tap output terminals and output or stop of broadcasting signals from each tap output terminal is set by a command signal from the center equipment, load on the power source equipment in each district does not increase, and so a power supply device of small capacity can be used. Especially when the invention is applied to the previously described cable broadcasting system of the invention, the power source equipment in each district has only to supply one tap device in the district with electricity necessary for setting output or stop of broadcasting signals from one tap output terminal by turning on one latching relay. The power source equipment can be made smaller.

In the invention, it is possible that the power supply device supplies electricity not only to the tap device in some district but also to an amplifier, a trunk bridger and the like provided on the transmission line in the district at the same time. In this case, since electric consumption of electronic devices other than the tap device (amplifier, trunk bridger and the like) is nearly constant and does not increase temporarily like the tap device when turning on latching relays, capacity of the power equipment can be suppressed to a minimum necessity by applying the invention.

BRIEF DESCRIPTION OF THE DRAWING FIGURES

The invention will now be described, by way of example, with reference to the accompanying drawings, in which:

FIG. 5 is a chart for explaining a data structure of output setting data read to a head-end controller and transmission operation of command signals;

FIG. 6 is a chart for explaining a data structure of transmission data transmitted from the center equipment to the trunk as command signals; and FIG. 7 is a timing chart of command signal transmission from the center equipment to each district.

DETAILED DESCRIPTION OF THE PREFERRED EMBODIMENT

Figure 1:
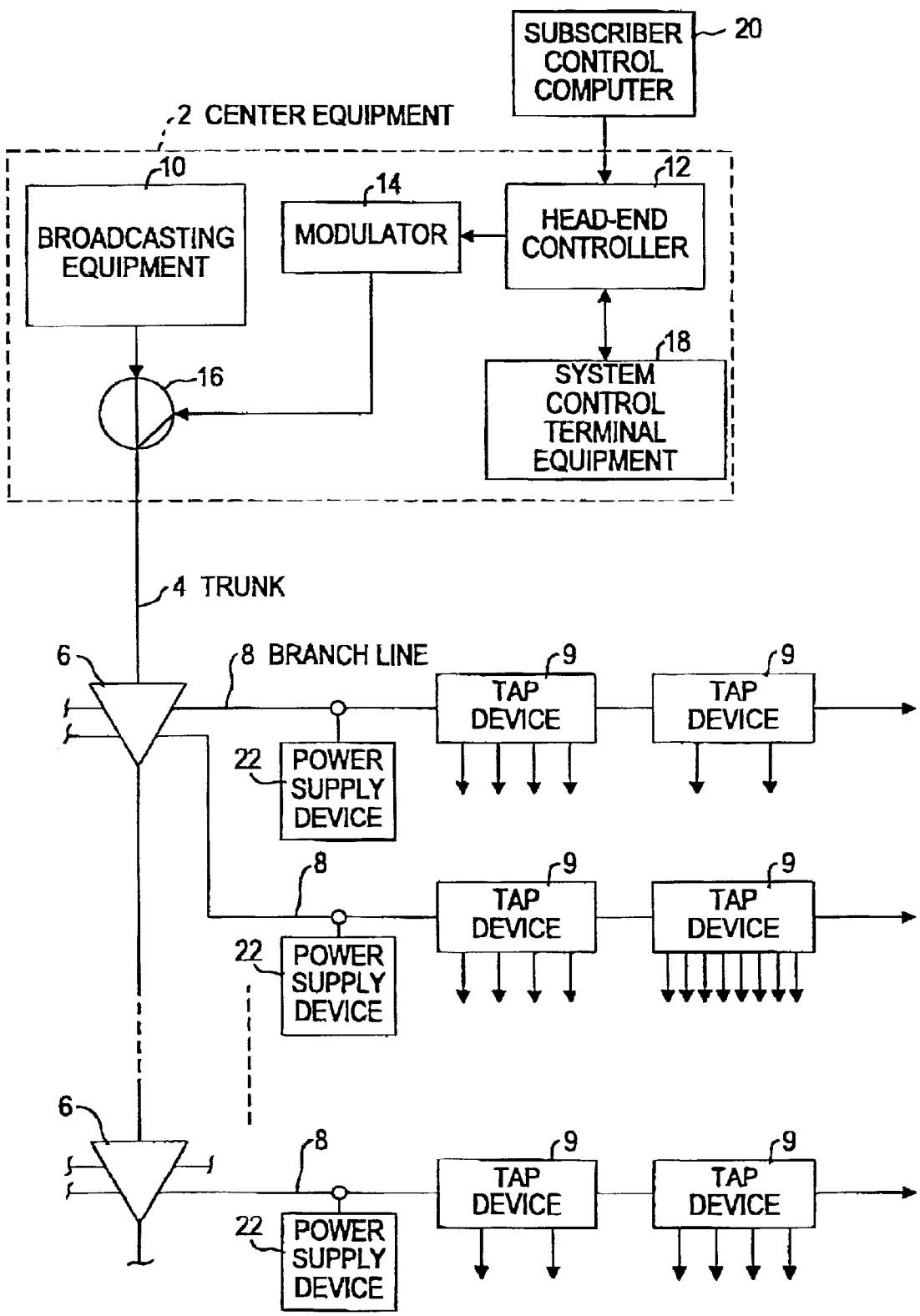
FIG. 1 is a schematic block diagram showing a CATV system of the embodiment.

As shown in FIG. 1, a CATV system of the embodiment transmits broadcasting signals of a predetermined frequency band (for example, 50 MHz–770 MHz) from a center equipment 2 to terminals via a transmission line comprising a trunk 4, plural branch lines 8 branched by trunk bridger 6 on the trunk 4 and the like. The broadcasting signals are transmitted to the subscribers' terminals of the system via many tap devices 9 provided on the branch line 8.

For this purpose, the center equipment is provided with a broadcasting equipment 10 which produces various television signals for broadcasting in the system using an antenna for receiving television broadcasting signals transmitted from the artificial satellites and terrestrial stations, video devices for reproducing television signals recorded on video tapes and video disks and television cameras for its own broadcasting. The broadcasting equipment 10 converts each of the television signals to a broadcasting signal corresponding to a predetermined channel and transmits the converted signals to the trunk 4.

The center equipment 2 is also provided with a head-end controller 12 for producing transmission data including identification data (address) having been allotted in advance to each tap device 9 and command data (command) expressing content of the command, a modulator 14 for converting the transmission data from the head-end controller 12 to a transmission command signal of a predetermined frequency band (for example, 70 MHz) by, for example, FSK modulation and a mixer 16 for mixing the command signal outputted by the modulator 14 to the trunk 4 (and, further, to the branch lines 8) with the broadcasting signal outputted by the broadcasting equipment 10 and transmitting the mixed signal.

The head-end controller 12 outputs command signals to each tap device 9 after producing transmission data in response to a command from a system control terminal equipment (computer) 18 or from a subscriber control computer 20 connected via a telephone line and the like. It includes a computer having communication function. In the embodiment, the head-end controller 12 and the modulator 14 function as the transmission equipment of the invention.

On the other hand, on the transmission line comprising the trunk 4, the branch lines 8 and the like, a power supply device 22 for supplying electronic devices such as the trunk bridger 6, the tap device 9 and the like on the transmission line with electricity is provided in each district dispersedly. The power supply device 22 works by being supplied with electricity from a commercial power source. It supplies the trunk 4 and branch lines 8 with power signals of alternate current of, for example, frequency of 60 Hz and voltage of 45V–90V. The power supply devices 22 are provided at a ratio of one power supply device per several electronic devices to be supplied with electricity, considering electricity consumption of the electronic devices.

The tap device 9 is the so-called tap-off for transmitting broadcasting signals to subscribers' terminals around the system. It is provided on the branch line 8 and provided with one or plural tap output terminals. In FIG. 1, tap devices 9 with 2, 4 and 8 tap output terminals, respectively, are shown.

Figure 2:
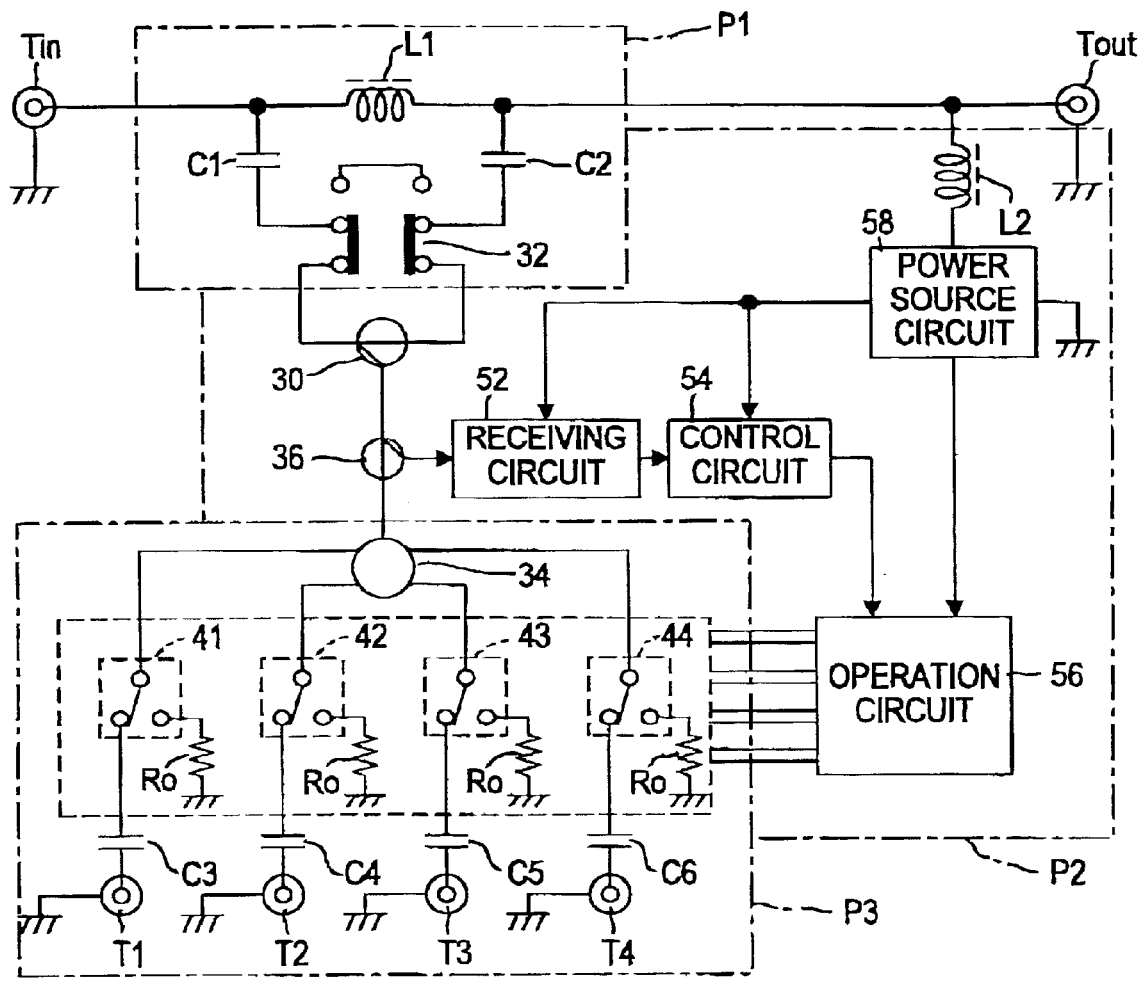
FIG. 2 is an electric circuit diagram showing a constitution of a tap device.

As shown in FIG. 2, the tap device 9 is provided with an input terminal Tin connected to the center equipment 2 side of the branch line 8, an output terminal Tout connected to the terminal side of the branch line 8 and plural tap output terminals T1, T2, T3, T4 (four terminals in FIG. 2). Between the input terminal Tin and the output terminal Tout, there is provided a choke coil L1 that passes power signals of low frequency alternate current supplied to the branch line 8 by the power supply device 22 and shuts broadcasting signals and command signals (hereinafter, called "high frequency transmission signals", altogether) transmitted from the center equipment 2 to the trunk 4 (and further to the branch lines 8). To both ends of the choke coil L1 (that is, input/output terminals, Tin and Tout), each end of capacitors C1, C2 which shut power signals of low frequency alternate current and pass high frequency transmission signals is connected, respectively. The other end of each of the capacitors C1, C2 is connected with a change-over switch 32 which changes over from direct connection of them to connection of them via a directional coupler 30, or vice versa.

The directional coupler 30 outputs the high frequency transmission signals inputted from the input terminal Tin to the output terminal Tout and branches a part of the high frequency transmission signals to the tap output terminals T1 to T4.

The choke coil L1, capacitors C1, C2 and change-over switch 32 as well as connecting plugs constituting the input terminal Tin and output terminal Tout for connecting with the transmission line (coaxial cables) are provided on a first substrate P1 which is directly secured in a housing of the tap device 9. The directional coupler 30 is provided on a second substrate P2 detachably secured to the first substrate P1 together with a power source circuit mentioned hereinafter. Therefore, when, for example, the change-over switch 32 is changed over to the opposite side of the directional coupler 30 to electrically cut the second substrate P2 from the first substrate P1, the tap device 9 functions only as a bypass circuit for passing power signals of alternate current and high frequency transmission signals through the choke coil L1 and the capacitors C1, C2, without any influence to transmission signals through the branch line 8.

Next, the high frequency transmission signals branched by the directional coupler 30 are inputted to a splitter 34 for four-part splitting (in FIG. 2) and distributed into a distribution number corresponding to the number of the tap output terminals T1–T4 by the splitter 34. The distributed high frequency transmission signals are transmitted to each of the tap output terminals T1–T4 via capacitors C3, C4, C5, C6 and outputted from the tap output terminals T1–T4 to terminal equipments of the subscribers' sides connected therewith. The capacitors C3–C6 shut power signals of low frequency alternate current and pass high frequency transmission signals.

In the signal passes from the splitter 34 to the tap output terminals T1–T4, there are provided latching relays 41, 42, 43, 44 (simply called a relay, hereinafter) for turning off or on the signal passes, respectively. Furthermore, in the signal passes of high frequency transmission signals from the directional coupler 30 to the splitter 34, there is provided a second directional coupler 36 for branching a part of high frequency transmission signals passing through the passes.

The branched high frequency transmission signals branched by the directional coupler 36 are inputted into a receiving circuit 52.

The receiving circuit 52 selectively receives command signals among the high frequency transmission signals inputted from the directional coupler 36 and demodulates transmission data outputted by the head-end controller 12. The demodulated data (received data) are inputted into a control circuit 54.

The control circuit 54 is composed mainly of one-chipped microcomputers consisting of CPUs, ROMs, RAMs and the like. When a received data is inputted from the receiving circuit 52, the control circuit 54 determines whether the received data is an operation mode setting command to itself and it should start setting operation of the operation mode in response to the command, and sets operation mode of the tap device 9 (specifically, whether high frequency transmission signals are to be outputted from the tap output terminals T1–T4) by operating the relays 41–44 via an operation circuit 56 when setting of operation mode is necessary.

A power source circuit 58 connected with the output terminal Tout via the choke coil L2 is also provided in the tap device 9. The choke coil L2 takes in a part of power signals of alternate current passing through the branch line 8 into the side of the power source circuit 58 and prevents the high frequency transmission signals from flowing to the side of the power source circuit 58. The power source circuit 58 generates a power source voltage V1 (for example, 24V) for switching on or off the relays 41–44 and a power source voltage V2 (for example, 5V) for operating the receiving circuit 52 and the control circuit 54 in a constant voltage, using the power signal of alternate current inputted via the choke coil L2.

Specifically, the power source circuit 58 commutates and smoothes the power signal of alternate current inputted via the choke coil L2 and generates the above-mentioned two power source voltages V1, V2 from the commutated and smoothed power signal of alternate current, using a three-terminal regulator and the like, to supply the operation circuit 66 with the power voltage V1 for switching the relays as well as to supply the receiving circuit 52 and control circuit 54 with the power source voltage V2.

The splitter 34, relays 41–44, capacitors C3–C6 and tap output terminals T1–T4 are mounted on a third substrate P3 integrally secured to the second substrate P2 provided with the directional coupler 30, by means of screws and the like. The second directional coupler 36, receiving circuit 52, control circuit 54, operation circuit 56 and power source circuit 58 are provided on the second substrate P2 together with the above-mentioned directional coupler 30.

The relays 41–44 are provided with terminal resistances Ro having the same impedance (50Ω, 75Ω and the like) as that of the coaxial cable constituting the transmission line. When the relays 41–44 are switched off, the output from the splitter 34 is terminated at the terminal resistances Ro to prevent high frequency transmission signals inputted from the splitter 34 from being reflected toward the splitter 34 side and to prevent noises generated at its periphery from intruding into it.

Figure 3:
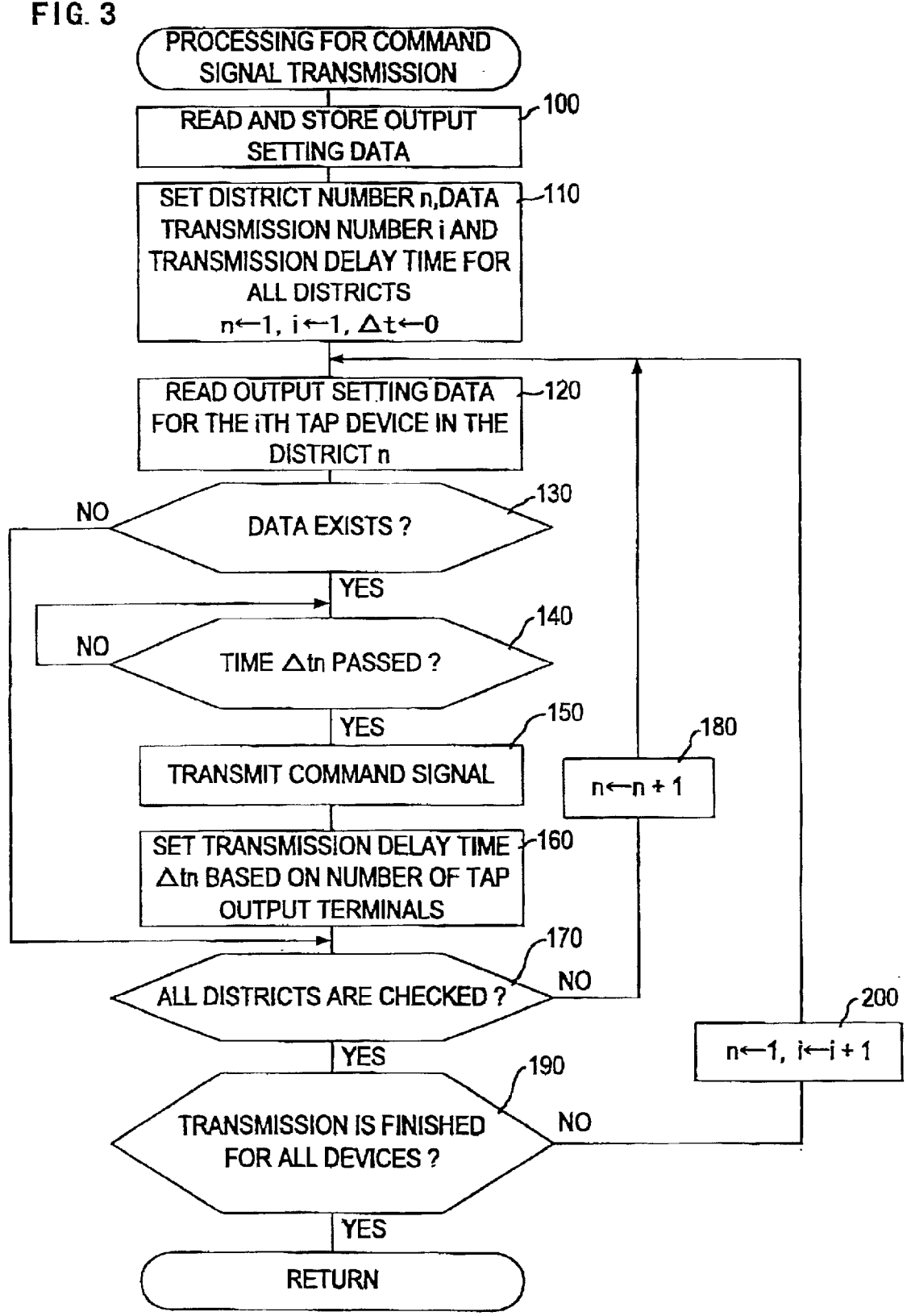
FIG. 3 is a flow chart showing the processing for command signal transmission executed at a head-end controller of the center equipment side.
Figure 4:
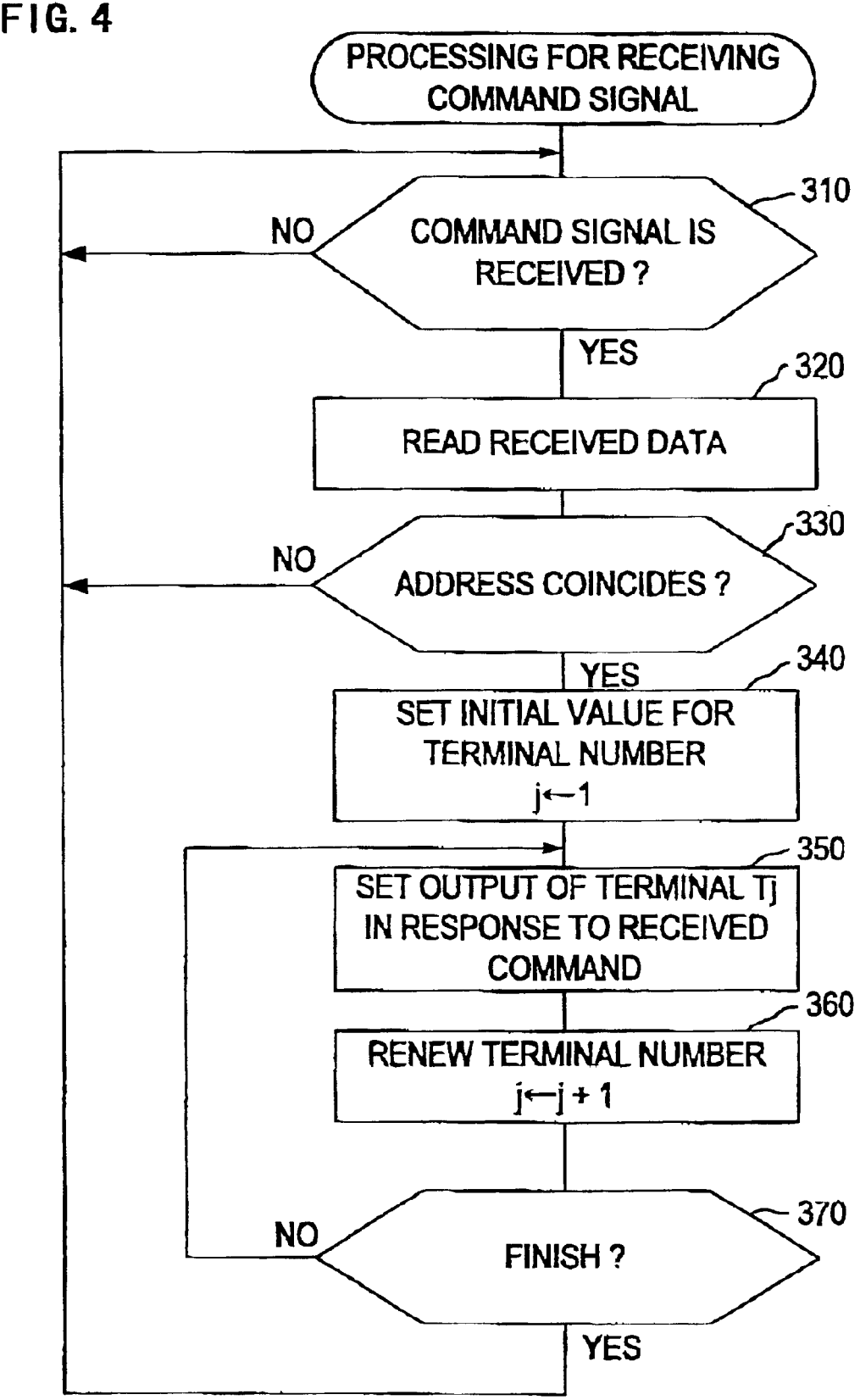
FIG. 4 is a flow chart showing the processing for receiving command signals executed at a control circuit of the tap device side.

FIG. 3 is a flow chart showing the processing for command signal transmission executed by the head-end controller 12 of the center equipment 2, when the head-end controller 12 transmits a command signal to the tap device 9 on the branch line 8 in response to a command from the system control terminal equipment 18 or the subscriber control computer 20. FIG. 4 is a flow chart showing the processing for receiving a command signal executed by the control circuit 54 in each tap device on the branch line 8 for setting output/stop of a high frequency transmission signal from the tap output terminal in response to a command signal from the center equipment 2 side.

The processing for command signal transmission in FIG. 3 is executed by the head-end controller 12 when a command for setting tap output of the tap device 9 is inputted from the system control terminal equipment 18 or the subscriber control computer 20. When the processing is started, at first at S100 (S shows a step.), output setting data are read for all the tap devices which are the objects of output setting and stored in a RAM in the head end controller 12 by carrying out data communication between the head end controller 12 and the system control terminal equipment 18 or the subscriber control computer 20.

As shown in FIG. 5, an output setting data includes an identification data (address) for identifying a tap device 9, a terminal number showing a number of tap output terminals T of the tap device 9, a district number of a district which a power supply device 22 for supplying the tap device 9 with electricity takes charge of and tap output setting values (command data, equivalent to the above-mentioned command) for showing whether high frequency transmission signals are to be outputted from (ON) or stopped at (OFF) the tap output terminals of the tap device 9 for each tap device 9. At S100, such output setting data are read for all the tap devices 9 which are the objects of output setting and stored in the RAM.

After the output setting data for all the tap devices which are the objects of output setting have been read at S100, at next S110, initial values are set (n←1, i←1, Δt←0) for the district number n identifying each district provided with a power supply device 22, a data transmission number i indicating a transmission number of command signals to each district identified by the district number n and a transmission delay time Δt set for each district in the processing described later, respectively, in order to make it possible to set in the processing described later in what order command signals are to be transmitted to the tap devices which are the objects of output setting among all the tap devices.

At subsequent S120, based on a district number n and a transmission number i having been set at present, the tap device 9 to which a command signal is to be transmitted next is identified as a tap device 9 (n,i) stored in i-th order within the output setting data in tap devices of the district number n among tap devices 9 whose output setting data have been stored in the RAM at S100 and the output setting data for the tap device 9 (n,i) is read among the output setting data in the RAM.

At next S130, it is determined whether the output setting data for the tap device 9 (n,i) is stored in the RAM and the output setting data was read at S120. If the number of tap devices set as the objects of output setting in the district of district number n is i or more, and so the output setting data for the tap device 9 (n,i) can not be read at S120, the processing is passed to S170, since it is not necessary to output a command signal to the tap device 9 (n,i). However, when the output setting data for the tap device 9 (n,i) can be read, the processing is passed to S140.

At S140, it is determined whether a transmission delay time Δtn set for the district has elapsed after a command signal was previously transmitted (specifically, after a command signal was transmitted to the tap device 9 (n,i-1)) in the same district including the tap device 9 (n,i) to which a command signal is to be transmitted now. When the transmission delay time Δ tn has elapsed, a transmission data to the tap device 9 (n,i) is produced at S150 and a command signal is transmitted to the tap device 9 (n,i) from the modulator 14 by outputting the transmission data to the modulator 14. Here, the transmission data produced at S150 is the address of the tap device 9 (n,i) added with a command including tap output setting values. (Refer to FIG. 6.)

After the processing for transmitting a command signal to the tap device 9 (n,i) has been carried out in such a way at S150, at S160, the number of tap output terminals (terminal number) of the tap device 9 (n,i) to which the command signal has been transmitted this time is read among the output setting data in the RAM, a time Δt necessary for setting tap output at the tap device 9 (n,i) to which a command signal has now been transmitted is searched and set as the transmission delay time Δtn. Then, the processing is passed to S170.

The transmission delay time Δtn is for setting as an interval (time) of command signal transmission a time equal to or longer than a time necessary for finishing tap output setting operation in the tap device 9 (n,i) for each district (district number n) provided with a power supply device 22. In the embodiment, since setting of tap output of each tap output terminal T is carried out one by one for the terminals in order by turning on the relay corresponding to each tap output terminal T in order, when setting output or stop of high frequency transmission signals from plural tap output terminals T in each tap device 9, the transmission delay time Δtn is set by the time of turning on one relay and the number of tap output terminals T.

Subsequently, a series of the processing from S120 to 160 is carried out once for each of all districts from the first to the last and it is determined whether the processing for command signal transmission has been carried out for all districts by determining at S170 whether the present district number n gets to a maximum number x corresponding to the number of districts made by sectioning the branch line which is provided with the power supply devices 22 into plural parts. When the district number n is smaller than the maximum number x and the processing for command signal transmission has not been carried out once for each of all districts, the district number n is renewed by adding a value "1" to the district number n at S180 and the processing is returned to S120 again.

On the other hand, when the district number n gets to the maximum number x and it is determined at S170 that the processing for command signal transmission has been carried out once for each of all districts, the processing is passed to S190 and it is determined whether command signal transmission to all the tap devices 9 in the output setting data stored in the RAM immediately after the start of the processing at S100 is finished. When it is determined that command signal transmission is finished at S190, the processing is finished. Contrary, when it is determined that command signal transmission is not finished, a value "1" is added to the transmission number i to renew the transmission number i and an initial value "1" is set for the district number n at S200. Then the processing is returned to S120.

As mentioned above, in the embodiment, when the center equipment 2 transmits command signals for tap output setting to the plural tap devices 9 on the branch lines 8, a command signal is transmitted in order at a rate of one tap device per each one of the plural districts sectioned by the plural power supply devices 22. The interval of command signal transmission to one district is controlled to be equal to or longer than the time (transmission delay time Δtn) necessary for the tap device 9 to which a command signal was transmitted previously to finish tap output setting operation (that is, time of turning on a relay) (Refer to FIG. 7.)

In the next, the processing for receiving command signals shown in FIG. 4 is processing executed repeatedly by the control circuit 54 in each tap device 9. In the processing, at first at S310, it is determined whether a command signal from the center equipment 2 is received by the receiving circuit 52, and when it is received, a received data demodulated from the command signal is read from the receiving circuit 52 at S320.

At subsequent S330, it is determined whether an address given to the read received data accords with previously set address of itself or not (that is, the received data is a command signal transmitted from the center equipment 2 to the tap device 9 itself or not), and when the received data is not to itself, the processing is returned to S310 again.

On the other hand, when it is determined at S330 that the address given to the received data accords with its own address and the received data is for itself, an initial value "1" is set as the terminal number j of the tap output terminal T which is the object of setting at S340. Then, at S350, the content of setting. (ON or OFF) of the tap output terminal Tj identified by the terminal number j is read and the condition of output or stop of high frequency transmission signals from the tap output terminal T is set by turning on a relay corresponding to the tap output terminal Tj in response to the content of setting.

At subsequent S360, the terminal number j is renewed by adding "1" to the terminal number j. At next S370, it is determined whether the renewed terminal number j became bigger than the number "y" of the tap output terminals T to determine whether the output setting has been finished for all the tap output terminals T1–Ty of the tap device 9.

When the terminal number j is smaller than or equal to the number "y" of the tap output terminals T and there remain tap output terminals for which output setting has not been finished, the processing is returned to S350 to carry out output setting operation for the terminals. When the terminal number j is bigger than the number "y" of the tap output terminals T and output setting has been finished for all the tap output terminals T1–Ty, the processing is returned to S310 to wait to receive a command signal.

As mentioned above, in the CATV system of the embodiment, when demand for tap output setting occurs to the plural tap devices 9 on the branch lines 8 at the center equipment 2 side, the head-end controller 12 reads output setting data for all the tap devices 9 which are the objects of the output setting and transmits command signals in order to the tap device at a ratio of one tap device 9 per one district covered by one of the power supply devices 22 dispersedly equipped on the branch lines 8 in response to the output setting data. The interval of transmission of command signals to one district is controlled to be equal to or longer than a time (a transmission delay time Δtn) necessary for the tap device 9 to which a command signal was previously transmitted to finish setting operation of the tap output (that is, turning on of the relay).

Therefore, according to the CATV system of the embodiment, since plural tap devices 9 which are supplied with electricity by one power supply device 22 do not carry out setting operation of the tap output (that is, turning on of the relays) at the same time, each power supply device 22 has only to supply electricity necessary for setting one tap device 9. According to the embodiment, the load on the power supply device 22 can be lowered and the power supply device 22 can be made small by suppressing electric capacity of the power supply device 22. Since capacity (electricity feedability) of the power supply device 22 can be made small by making the power supply device 22 small, the cost of total system can be lowered.

Especially in the embodiment, since in the tap device 9 which sets output or stop of transmission signals from tap output terminals (tap output), the tap output is set one by one for the tap output terminals in spite of the number of terminals, the power supply device 22 has only to supply electricity necessary for the tap device 9 to turn on one relay. Therefore the above-mentioned effect becomes surer.

One embodiment of the invention was described above. The invention is not limited to the embodiment but can be embodied variously.

Though in the above-mentioned embodiment, the tap devices 9 are provided on the branch lines 8 branched from the trunk 4, the same effect can be attained when the invention is applied to a system in which the tap devices 9 are provided on the trunk 4, on sub-branch lines branched from the branch line 8 or dispersedly on these lines and trunk 4.

In the above-mentioned embodiment, the splitter 34 is provided in the tap device 9 on the branch line 8 and high frequency transmission signals including broadcasting signals distributed by the splitter 34 are outputted from the multiple tap output terminals to the corresponding terminal equipments. The same effect as that of the above-mentioned embodiment can be attained when the invention is applied to a system provided with a tap device which has no splitter 34 and is devised to output high frequency transmission signals branched by the directional coupler 30 from a tap output terminal.

What is claimed is:

1. A cable broadcasting system comprising:
   a center equipment, including
      a broadcasting equipment for transmitting broadcast signals on a transmission line, and
      a controller for transmitting command signals for controlling distribution of the broadcast signals to broadcast signal receiving terminals through the transmission line, and
   at least one receiving district, each receiving district including
      a plurality of tap devices connected from the transmission line for distributing the broadcast signals from the transmission line to the broadcast signal receiving terminals, and
      a district power supply connected from a power source and providing a power signal through the transmission line to the tap devices of the receiving district, wherein
         the command signals are separate and independent from the power signal,
      each tap device including
         at least one switchable tap path for distributing the broadcast signal from the transmission line to corresponding broadcast signal receiving terminals,
         at least one control relay in each tap path for controlling connection of the tap path to the broadcast signal receiving terminal,
         a tap control connected from the transmission line and responsive to the command signals for controlling the control relays according to the command signals, and a tap device power supply connected from the power signal on the transmission line and providing power to the tap device, wherein in a sequence of command signals transmitted by the center equipment controller to control the control relays of a plurality of tap paths, successive command signals are transmitted to different receiving districts, wherein the controller of the central equipment transmits a command signal to a receiving district having at least one tap device to which a command signal is to be transmitted, transmits a command signal to a receiving district which has not received a command signal in a proceeding transmission of a command signal and which has at least one tap device to which a command signal is to be transmitted, and repeats the transmission of command signals as necessary to provide at least one command signal to each tap device which is to receive a command signal, thereby limiting the tap device switching operation executing in the receiving district to one tap device per receiving district such that a power demand to the district power supply due to the tap device switching operations will remain below a predetermined limit.

2. The cable broadcasting system of claim 1, wherein:

the center equipment controller will transmit a command signal to a tap device in a receiving district only after an operating time required for a tap device in the receiving district to complete execution of a preceding command signal has elapsed.

3. The cable broadcasting system of claim 1, wherein a tap device further includes:

a directional coupler connected from the transmission line for branching connection of the broadcast signal from the transmission line to each of the tap paths, wherein the at least one control relay of each tap path is controllable through the tap control and by the command signals to switchably connect the tap path into one of an on state and an off state to the corresponding broadcast signal receiving terminal according to the command signals.

4. The cable broadcasting system of claim 1, wherein a tap device further includes:

a plurality of switchable tap paths, a directional coupler connected from the transmission line for branching connection of the broadcast signal from the transmission line to each of the tap paths, wherein the at least one control relay of each tap path is controllable through the tap control and by the command signals to switchably connect the tap path into one of an on state and an off state to the corresponding broadcast signal receiving terminal according to the command signals, and wherein when the tap control controls the control relays of a plurality of tap paths of a tap device, the tap control controls each control relay to switchably connect each tap path into one of an on state and an off state in an order.

5. A cable broadcasting system comprising:

a center equipment, including a broadcasting equipment for transmitting broadcast signals on a transmission line, and a controller for transmitting command signals for controlling distribution of the broadcast signals to broadcast signal receiving terminals through the transmission line, and at least one receiving district, each receiving district including a plurality of lap devices connected from the transmission line for distributing the broadcast signals from the transmission line to the broadcast signal receiving terminals, and a district power supply connected from a power source and providing a power signal through the transmission line to the tap devices of the receiving district, wherein the command signals are separate and independent from the power signal, each tap device including at least one switchable tap path for distributing the broadcast signal from the transmission line to corresponding broadcast signal receiving terminals, at least one control relay in each tap path for controlling connection of the tap path to the broadcast signal receiving terminal, a tap control connected from the transmission line and responsive to the command signals for controlling the control relays according to the command signals, and a tap device power supply connected from the power signal on the transmission line and providing power to the tap device, wherein in a sequence of command signals transmitted by the center equipment controller to control relays of a plurality of tap paths, the center equipment controller will transmit a command signal to tap device in a receiving district only after a predetermined time interval after a transmission of a preceding command signal to a tap device in the receiving district wherein the predetermined time interval is at least a time required to complete a tap device switching operation in the receiving district, thereby limiting the tap device switching operation executing in the receiving district to one tap device per receiving district such that a power demand to the district power supply due to the tap device switching operations will remain below a predetermined limit.

* * * * *